United States Patent
Young et al.

(10) Patent No.: US 11,999,219 B2
(45) Date of Patent: Jun. 4, 2024

(54) REMOVABLE VEHICLE SIDE PANEL SYSTEM

(71) Applicant: Teijin Automotive Technologies, Inc., Auburn Hills, MI (US)

(72) Inventors: Jeannette Young, Auburn Hills, MI (US); Timothy Young, Auburn Hills, MI (US); Daniel Edmunds, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 0 days.

(21) Appl. No.: 17/856,240

(22) Filed: Jul. 1, 2022

(65) Prior Publication Data

US 2023/0028850 A1 Jan. 26, 2023

Related U.S. Application Data

(60) Provisional application No. 63/223,588, filed on Jul. 20, 2021.

(51) Int. Cl.
*B60J 7/10* (2006.01)
*B60J 1/08* (2006.01)
*B60J 7/11* (2006.01)
*B60J 7/19* (2006.01)

(52) U.S. Cl.
CPC ............... *B60J 1/085* (2013.01); *B60J 7/106* (2013.01); *B60J 7/11* (2013.01); *B60J 7/194* (2013.01)

(58) Field of Classification Search
CPC ..... B60J 1/085; B60J 7/11; B60J 7/192; B60J 7/194; B60J 7/106
See application file for complete search history.

(56) References Cited

U.S. PATENT DOCUMENTS

| | | | | |
|---|---|---|---|---|
| 4,121,870 A | * | 10/1978 | Oakey | B60J 7/11 296/218 |
| 4,131,970 A | * | 1/1979 | Le Van | B60J 7/1642 49/141 |
| 4,366,683 A | * | 1/1983 | Labbe | E05C 3/08 70/211 |
| 4,415,189 A | * | 11/1983 | Kastelic, Jr. | E05C 3/08 292/196 |
| 4,468,064 A | * | 8/1984 | McAdams, Sr. | B60J 7/194 296/224 |
| 4,548,434 A | * | 10/1985 | Princell | B60J 7/19 292/223 |

(Continued)

OTHER PUBLICATIONS

Office Action issued in corresponding Canadian Appln. No. 3168323, dated Feb. 16, 2024.

*Primary Examiner* — Jason S Morrow
(74) *Attorney, Agent, or Firm* — MaxGoLaw PLLC

(57) ABSTRACT

A vehicle removable panel system including a fixed vehicle structure and one or more removable panels configured to removably engage with the fixed vehicle structure. The vehicle removable panel system providing increased configurability, modularity, and functionality and being easily configurable by a single user without the use of tools. The vehicle removable panel system including a seal with moisture resistance and edges suitable for sealing the removable vehicle panels to other vehicle components including the fixed vehicle structure.

20 Claims, 8 Drawing Sheets

(56) References Cited

U.S. PATENT DOCUMENTS

| | | | | |
|---|---|---|---|---|
| 4,626,026 | A * | 12/1986 | Hasegawa | B60J 7/11 |
| | | | | 296/213 |
| 4,637,649 | A * | 1/1987 | Cambria | B60J 7/106 |
| | | | | 296/218 |
| 4,729,596 | A * | 3/1988 | Fujihara | B60J 7/106 |
| | | | | 296/213 |
| 6,851,739 | B2 * | 2/2005 | Morley | B60J 7/106 |
| | | | | 296/141 |
| 8,991,896 | B1 * | 3/2015 | Whitehead | B60J 7/196 |
| | | | | 296/121 |
| 10,815,709 | B2 * | 10/2020 | Lovasz | E05B 83/00 |
| 11,053,715 | B2 * | 7/2021 | Damboiu | E05B 39/007 |
| 11,241,944 | B2 * | 2/2022 | Willard | B60J 7/11 |
| 11,571,954 | B2 * | 2/2023 | Prather | B60J 7/11 |
| 11,613,224 | B2 * | 3/2023 | Eddings | B60R 21/13 |
| | | | | 280/756 |
| 11,667,178 | B2 * | 6/2023 | Bojanowski | B60J 10/82 |
| | | | | 49/465 |
| 2019/0249473 | A1 * | 8/2019 | Damboiu | B60J 1/085 |
| 2019/0271182 | A1 | 9/2019 | Lovasz et al. | |
| 2021/0178873 | A1 | 6/2021 | Boyle et al. | |
| 2023/0137099 | A1 * | 5/2023 | Durham | B60R 21/13 |
| | | | | 296/218 |

* cited by examiner

REMOVABLE VEHICLE SIDE PANEL SYSTEM

CROSS REFERENCE TO RELATED APPLICATIONS

This application claims priority benefit of U.S. Provisional Application Ser. No. 63/223,588, filed 20 Jul. 2021, the contents of which are hereby incorporated by reference.

FIELD OF THE INVENTION

The present invention in general relates to a vehicle body panel assembly and, more particularly to a vehicle body panel that is removable from a vehicle frame for increased configurability.

BACKGROUND OF THE INVENTION

Vehicles are generally constructed around a frame, where a vehicle's finished surface panels are secured or bonded to substructures to form body panels that are designed for attachment to the irregular surfaces of the frame. These structures typically include a finished surface outer panel bonded at multiple points to a structural inner panel that may be stamped from sheet metal or formed from composite materials such as SMC. The periphery of outer panel (outer skin) and structural inner panel are typically bonded together at the edges.

Vehicles with increased configurability, modularity, and functionality, especially for sport utility vehicles (SUV), trucks, and vans have become increasingly popular. Additionally, lightweight vehicles lead to improved fuel economy. Currently, vehicle configurability is generally limited to removable roof systems available on some vehicles. However, existing designs for removable vehicle roof tops are cumbersome, often requiring tools and/or more than one user to install and remove the roof, and only provide a single installation configuration, thereby limiting customization and utility of the roof system.

Thus, there exists a need for a vehicle body panel that is removable from a vehicle frame for increased configurability, modularity, and functionality.

SUMMARY OF THE INVENTION

The present disclosure provides a vehicle removable panel system that includes a fixed vehicle structure and one or more removable panels configured to removably engage with the fixed vehicle structure. According to embodiments, at least one of the removable panels includes a transparent portion. According to embodiments, the removable panels each have at least one locator pin extending from a first edge thereof configured to engage with a corresponding hole bushing positioned in the fixed vehicle structure. According to embodiments, the removable panels include at least one lock configured to interact with a bracket of the fixed vehicle structure to lock the removable panel to the fixed vehicle structure. According to embodiments, the removable panels are interchangeable. According to embodiments, the vehicle removable panel system includes a seal with moisture resistance and edges suitable for sealing the removable vehicle panels to other vehicle components including the fixed vehicle structure.

The vehicle removable panel system provides increased configurability, modularity, and functionality and is easily configurable by a single user without the use of tools.

BRIEF DESCRIPTION OF THE DRAWINGS

The present invention is further detailed with respect to the following drawings that are intended to show certain aspects of the present invention, but should not be construed as a limit on the practice of the present invention.

DESCRIPTION OF THE INVENTION

Figure 1:
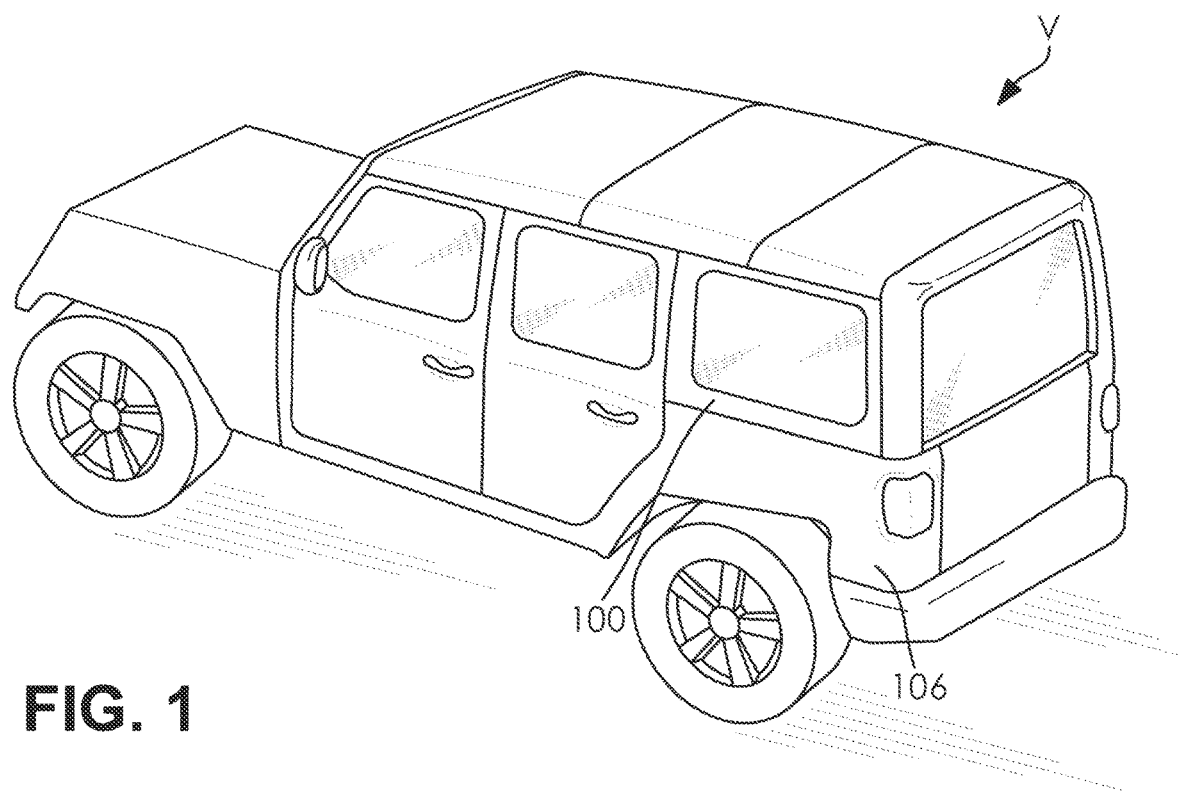
FIG. 1 is a perspective view of a removable vehicle panel system according to embodiments of the present disclosure installed on a vehicle.
Figure 2:
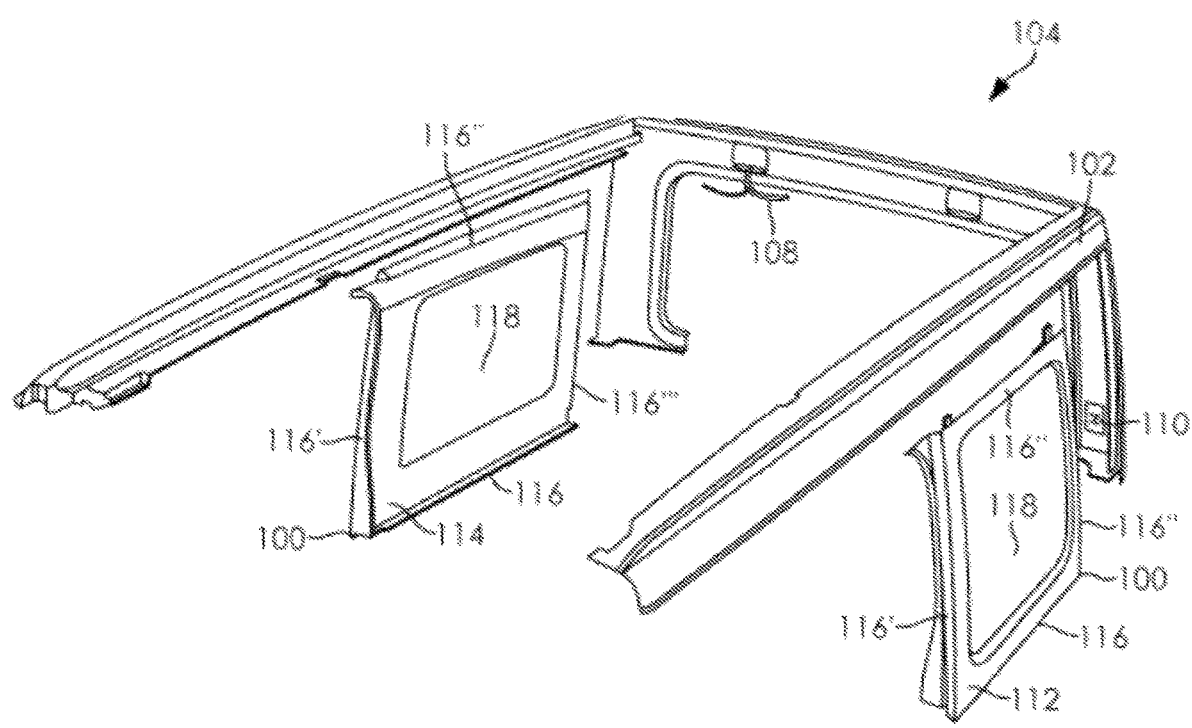
FIG. 2 is a perspective view of a vehicle frame and removable vehicle panels according to embodiments of the present disclosure.

The present invention has utility as a vehicle body panel 100 that is removable from a vehicle frame 102 for increased configurability, modularity, and functionality. The inventive removable vehicle body panel may be part of a system of removable and reconfigurable vehicle body panels. The removeable vehicle body panel system is easily configurable by a single user and that provides a seal with moisture resistance and edges suitable for sealing the removable vehicle panels to other vehicle components.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Embodiments of the removable vehicle panel system 104 include one or more removable panels 100 that are configured to removably engage with a fixed vehicle structure 102 of a vehicle V. According to embodiments, the fixed vehicle structure 102 is a structural frame of the vehicle and/or other body panels 106 of the vehicle, including doors, hoods, trunks, roofs, quarter panels, pillars, etc. According to embodiments, the fixed vehicle structure 102 may include electrical wiring. Additionally, the electrical wiring internal to the fixed vehicle structure 102 may provide electrical harness connectors that attach to electrical harness connectors within a panel 100, thus electrifying the panels 100 to provide some electrified functionality to the panel 100, such as motorized window operation or a heating element for defrosting a window contained within the panel 100. A panel 100 of the removable vehicle panel system 104 has a first side 112, which is a vehicle exterior side, an opposite second side 114, which is a vehicle interior side, and a plurality of edges 116, 116', 116", 116'" that make up the perimeter of the panel 116, 116', 116", 116". As shown in the figures, the panels 100 are rectangular, however other shapes are also contemplated. That is, the panels 100 may be rectangular, square, circular, triangular, polygonal, etc. According to embodiments, the panels 100 are planar or slightly curved.

According to embodiments, each panel 100 is formed of a sheet molding compound, injection molded plastic, sheet metal, glass, a composite sandwich panel, or a combination thereof. As an example, a suitable composite sandwich panel assembly may be as described in International Application Serial No. PCT/US2020/12350 filed on Jan. 6, 2020, which is thereby incorporated by reference. According to embodiments, a panel 100 includes a transparent portion 118 that acts as a window, which according to embodiments is formed of glass or clear polycarbonate.

According to embodiments, each panel 100 includes a flange 120 extending from an edge 116" of the panel 100. The flange 120 is configured to engage with a recess 122 formed in the fixed vehicle structure 102 of the vehicle. According to embodiments such as that shown in FIG. 8 the flange 120 has a hooked shape, however, other suitable shapes are contemplated. According to further embodiments, each panel 100 includes at least one locator pin 126, and preferably at least two locator pins 126. According to embodiments, the locator pin 126 extends from a first edge 116" of the panel 100 or from a projection 128 positioned on the first side 112 or the second side 114 of the panel 100 near the first edge 116" of the panel 100. The at least one locator pin 126 of each panel 100 is configured to engage with the fixed vehicle structure 102 of the vehicle V. According to embodiments, the at least one locator pin 126 of each panel 100 engages with a corresponding hole or bushing 130 positioned in the fixed vehicle structure 102 of the vehicle 100.

Figure 11:
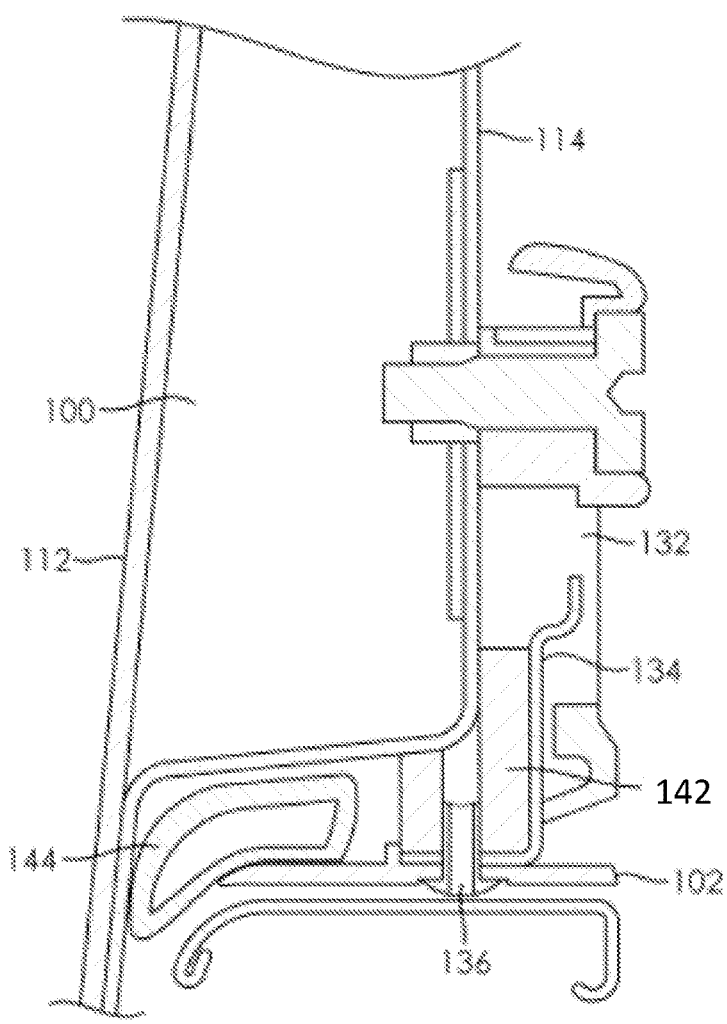
FIG. 11 is a cross sectional view of the removable vehicle panel system according to embodiments in an installed position cut along line 11-11 of FIG. 7.
Figure 12:
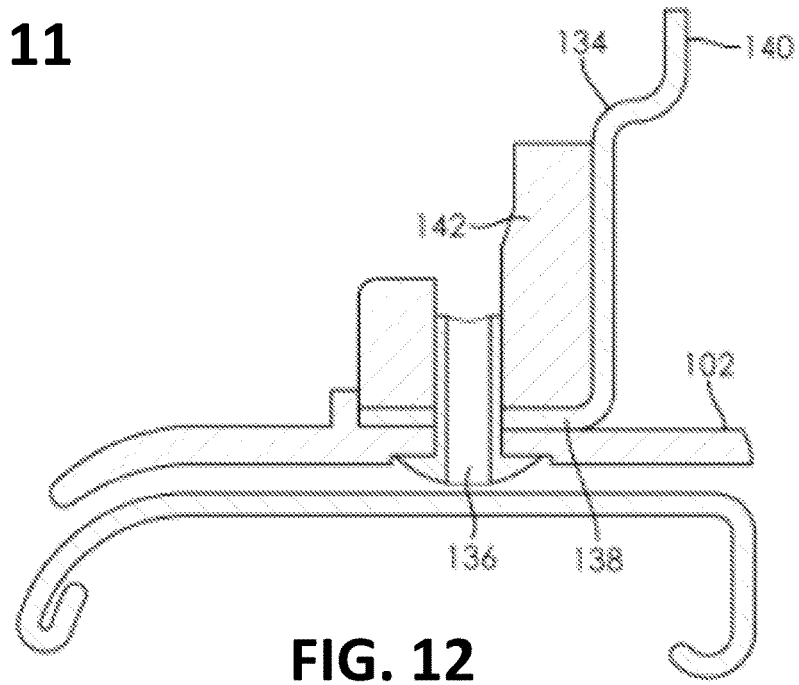
FIG. 12 is a cross sectional view of a receiver bracket installed on a fixed structure of a vehicle according to embodiments.
Figure 13:
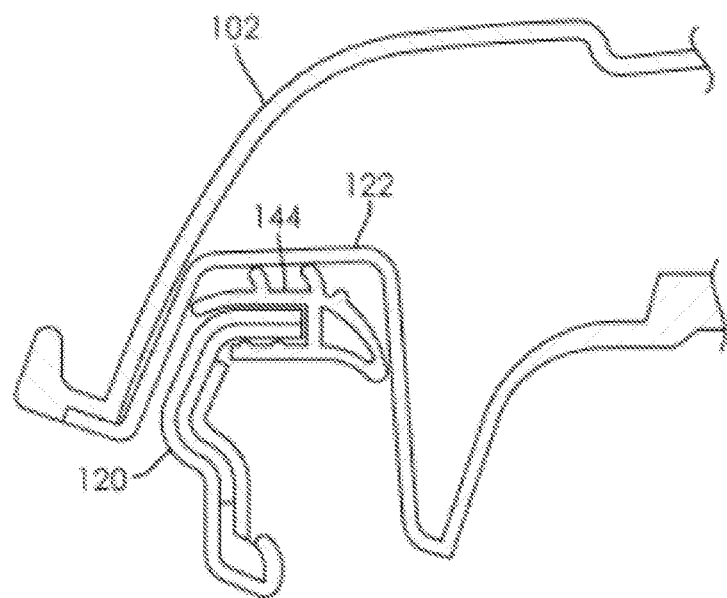
FIG. 13 is a cross sectional view of the removable vehicle panel system according to embodiments in an installed position cut along line 13-13 of FIG. 7.
Figure 14:
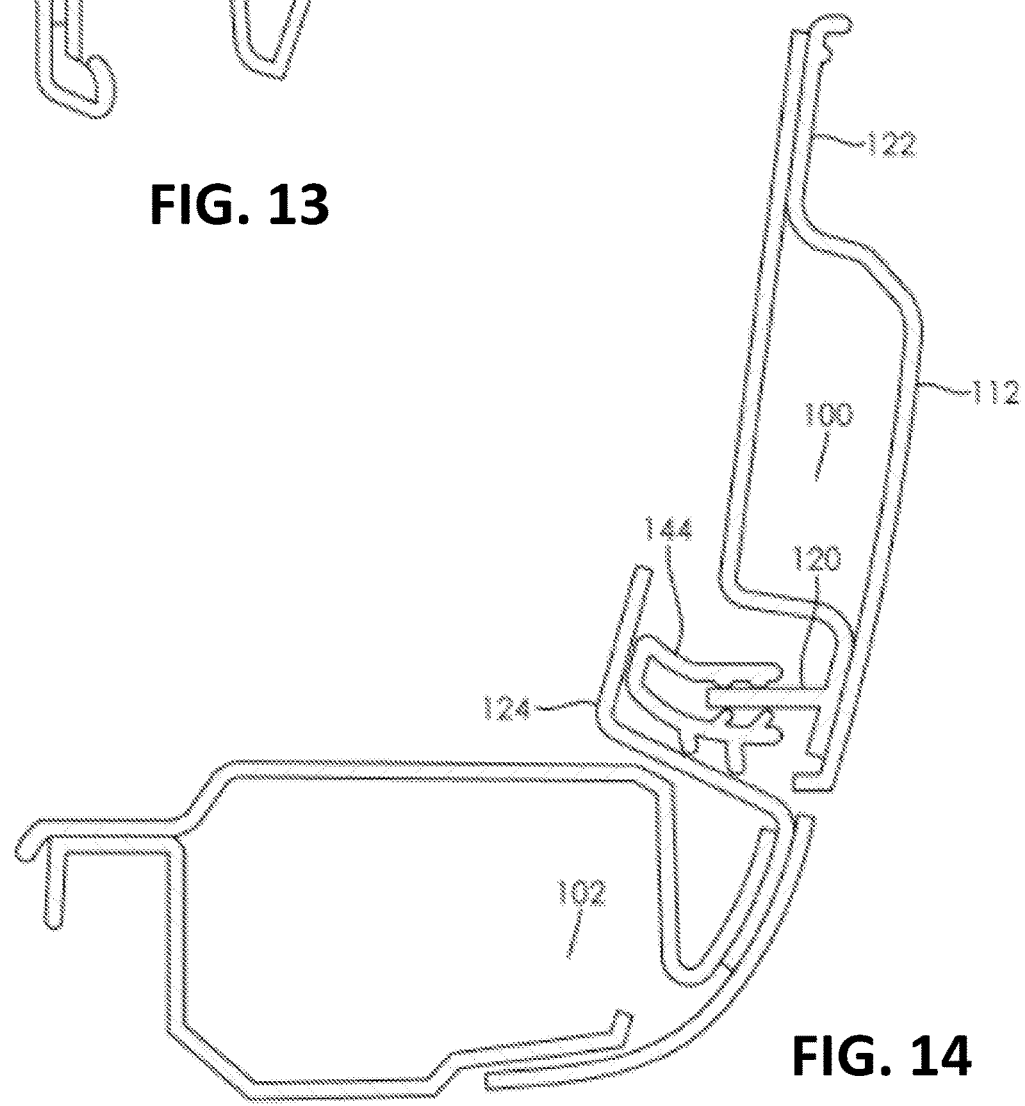
FIG. 14 is a cross sectional view of the removable vehicle panel system according to embodiments in an installed position cut along line 14-14 of FIG. 7.

According to embodiments, each panel 100 includes a plurality of locks 132 that are configured to interact with the fixed vehicle structure 102 or with other removable panels or vehicle body panels to secure the removable panels 100 to the fixed vehicle structure 102, other removable panels 100, or other vehicle body panels 106. According to embodiments, the locks 132 interact with a receiver bracket 134 of the fixed vehicle structure 102, other removable panels, or other vehicle body panels. As shown in FIGS. 11 and 12, a receiver bracket 134 is attached to the fixed vehicle structure 102 by a fastener 136. The receiver bracket 134 is generally L-shaped, with the fastener 136 attaching to a first portion 138 of the receiver bracket 134, leaving the second end portion 140 of the receiver bracket free for engagement with a lock 132. According to embodiments, the receiver bracket 134 includes a bumper 142 positioned therein and attached by the fastener 136. The bumper 142 provides a soft, semi-compressible surface upon which the panel 100 engages when installed in the fixed vehicle structure 102.

According to embodiments, the locks 132 are turn latches that include a rotatable lever arm that rotates about a pivot point. When the latch is rotated such that the arm extends to engage with the fixed vehicle structure, the latch is in the locked position, and when the latch is rotated such that the arm does not engage with the fixed vehicle structure, the latch is in the unlocked positioned. According to embodiments, the locked position is offset from the unlocked position by 90 degrees. According to embodiments, the plurality of locks 132 are positioned on the interior side of the panel 114 or the exterior side of the panel 112. According to embodiments, the locks 132 are positioned near an edge 116 of the panel 100, which according to embodiments may be the edge 116 that is opposite the edge 116" near which the at least one locator pin 126 is positioned.

Figure 8:
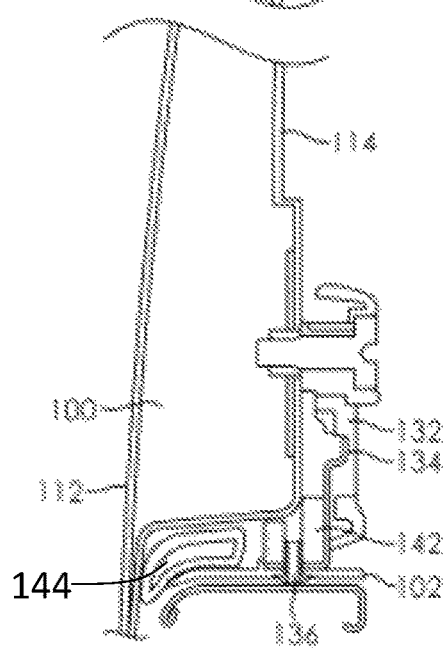
FIG. 8 is a cross sectional view of a removable vehicle panel system according to embodiments in an installed position cut along line 8-8 of FIG. 7.
Figure 9:
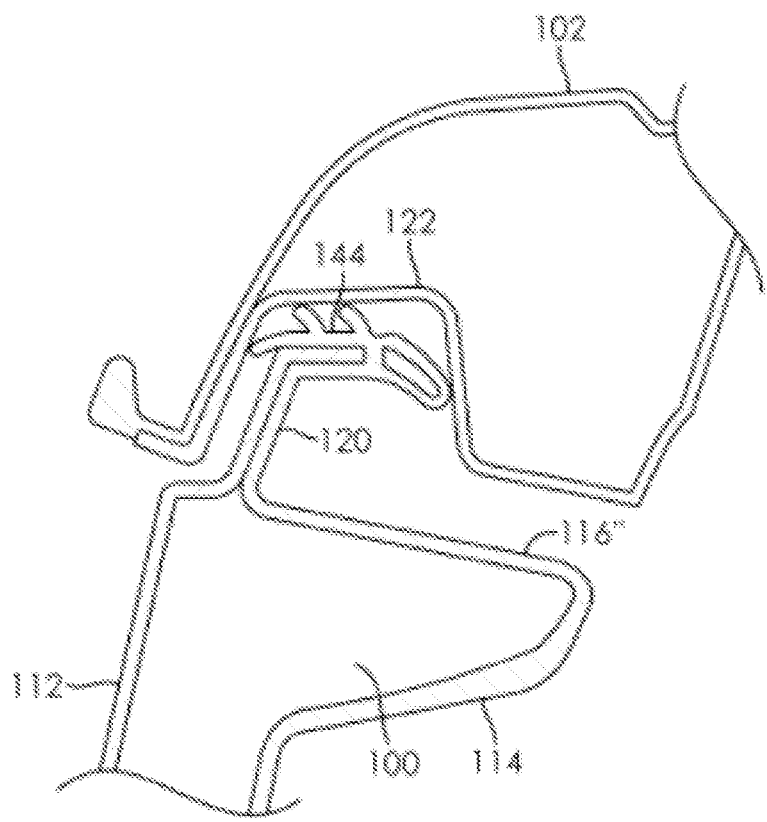
FIG. 9 is an enlarged detailed view of a portion of FIG. 8 as indicated.
Figure 10:
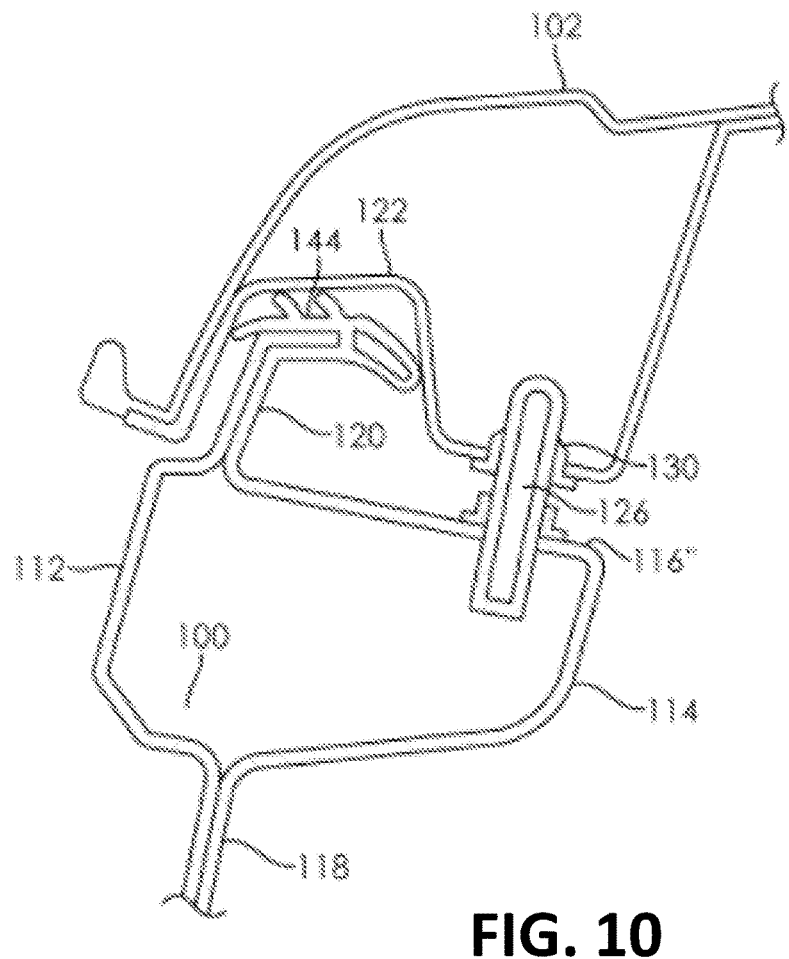
FIG. 10 is a cross sectional view of the removable vehicle panel system according to embodiments in an installed position cut along line 10-10 of FIG. 7.

According to embodiments, the removable panel system 104 additionally includes a water management system 144 positioned between a removable panel 100 and the fixed vehicle structure 102, between other removable panels, and/or other body panels 106 of the vehicle. According to embodiments, the water management system 144 is attached to each of the removable panels 100, for example along at least one edge 116, 116', 116", 116'" of the panel 100. According to embodiments, the water management system 144 is positioned along only the top edge 116" of the panel 100 and along a rear edge of the flange 120. According to embodiments, a portion of the water management system 144 is also attached to a lower face of the panel 100. According to embodiments, the water management system 144 is a weather strip of sealable gasket that is attached to a panel 100 along the perimeter of the removable panel 100. According to embodiments, As shown in FIG. 8, the weather strip or sealable gasket 144 is positioned on the flange 120 that extends from at least one edge 116" of the panel 100 and that configured to engage with the recess 122 formed in the fixed vehicle structure 102 of the vehicle. When the panel 100 is locked into place within the fixed vehicle structure 102, the weather strip or sealable gasket 144 is compressed against the fixed vehicle structure, thereby forming a watertight seal between the fixed vehicle structure and the panel.

Figure 3:
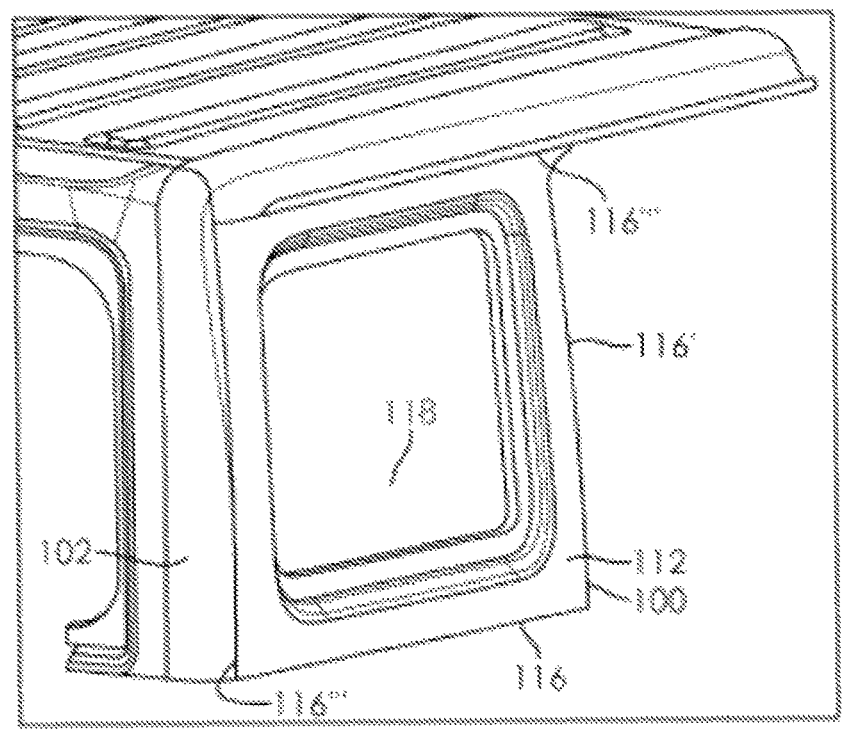
FIG. 3 is an exterior perspective view of the removable vehicle panel system according to embodiments in an installed position.
Figure 4:
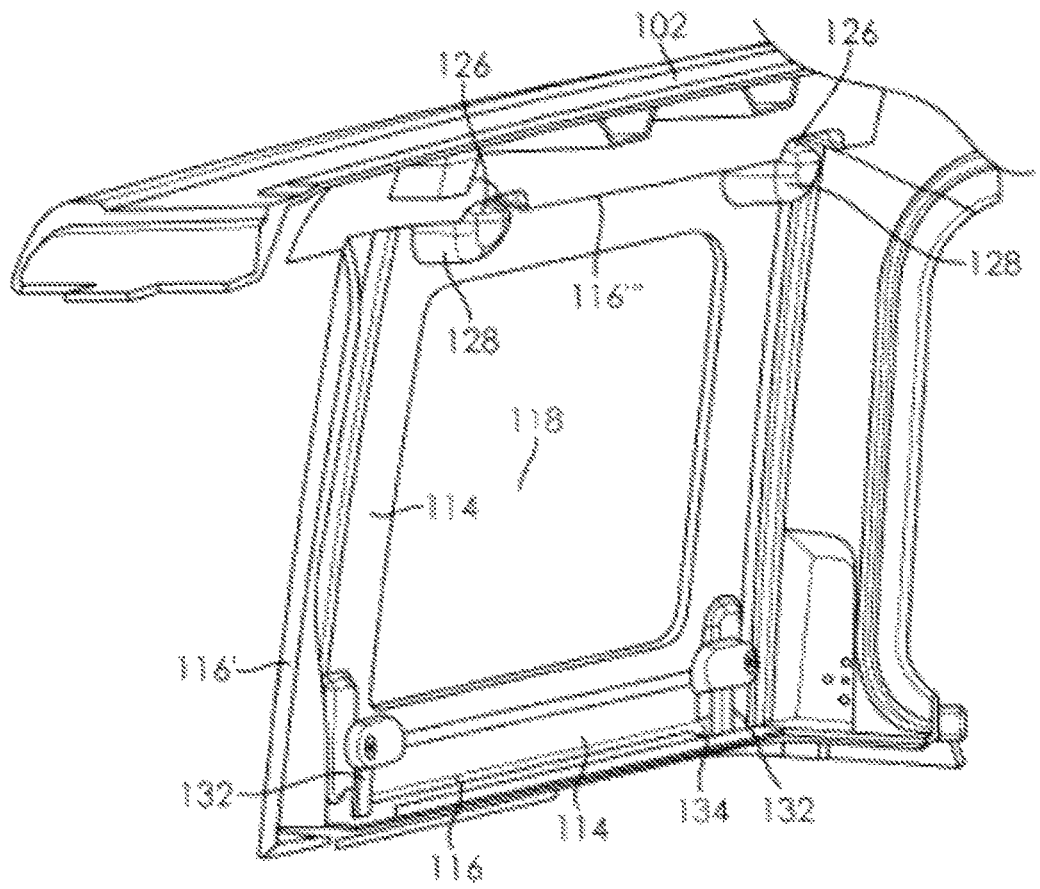
FIG. 4 is an interior perspective view of the removable vehicle panel system of FIG. 3 in an installed position.
Figure 5:
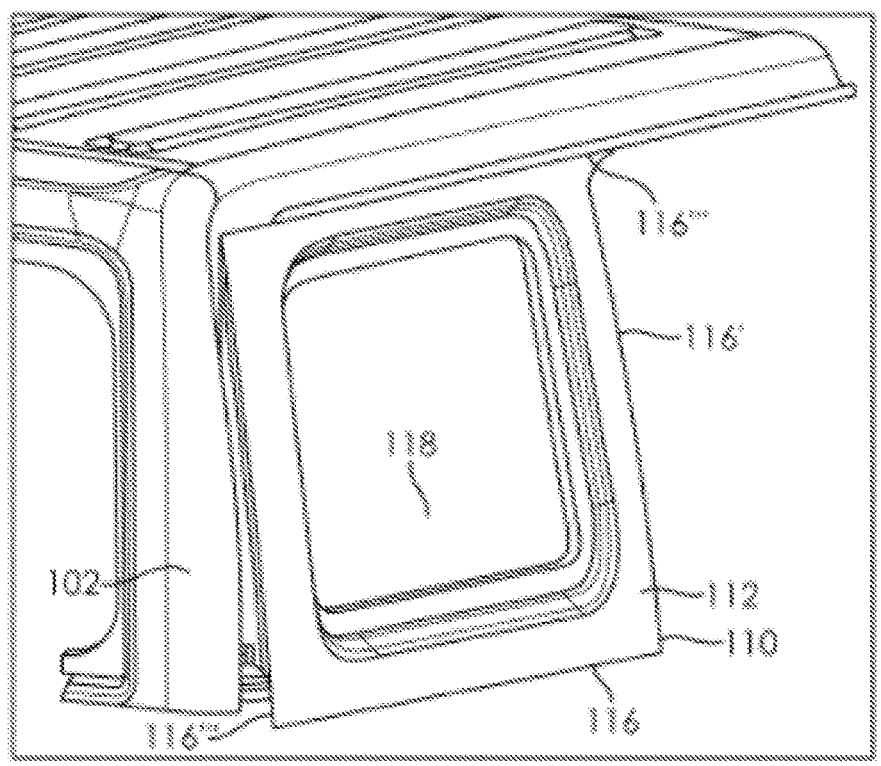
FIG. 5 is an exterior perspective view of the removable vehicle panel system according to embodiments in an uninstalled position.
Figure 6:
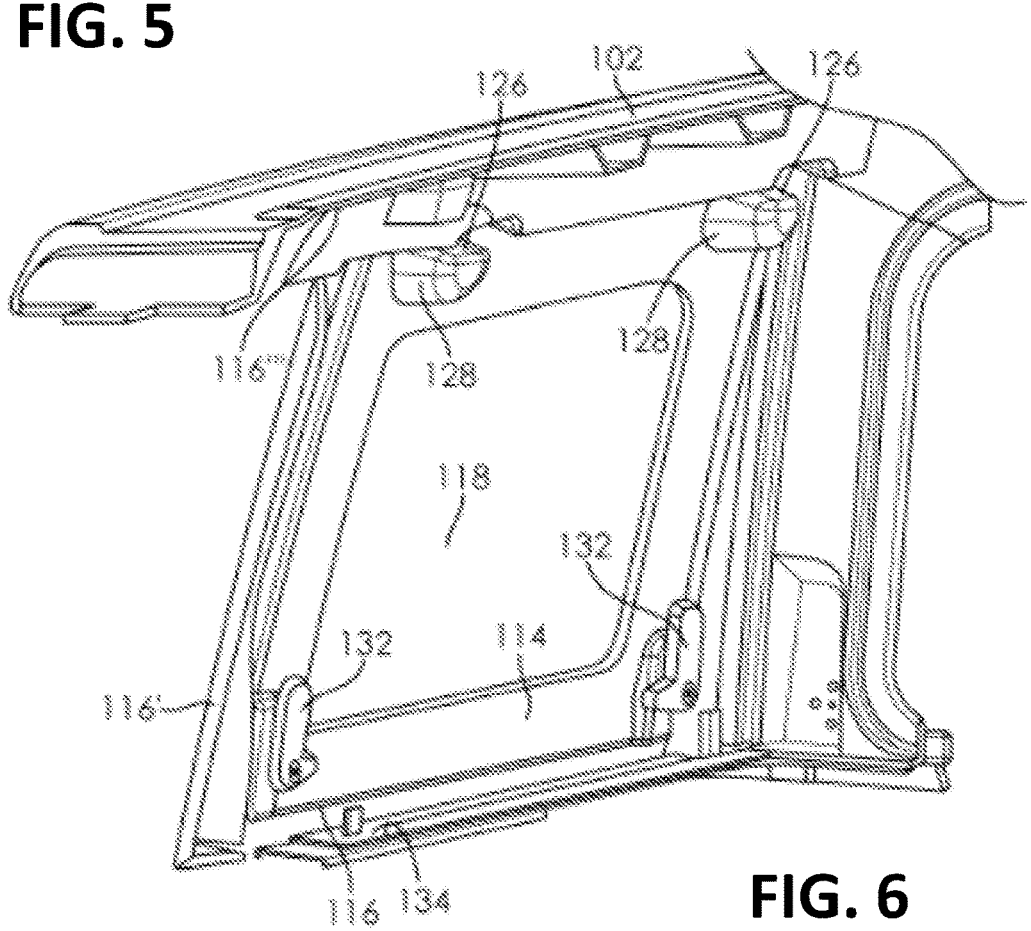
FIG. 6 is an interior perspective view of the removable vehicle panel system of FIG. 5 in an uninstalled position.
Figure 7:
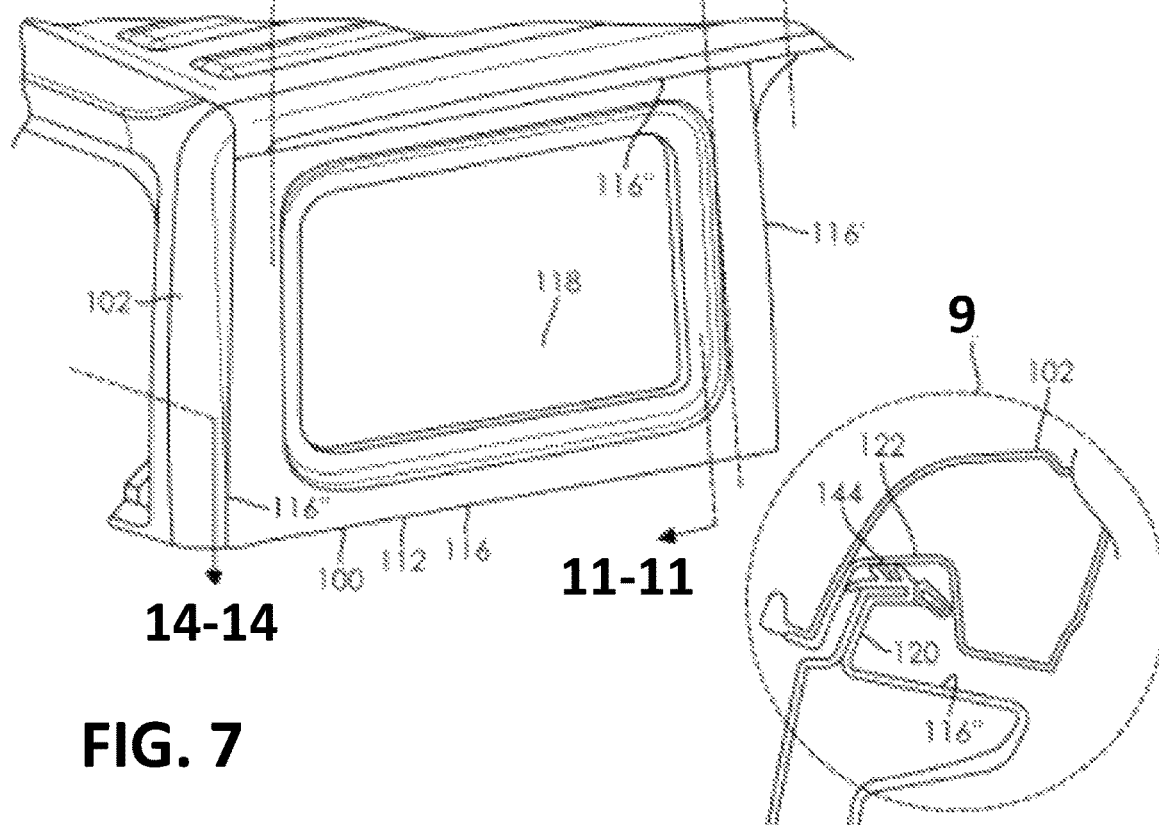
FIG. 7 is an exterior perspective view of the removable vehicle panel system according to embodiments.

According to embodiments, a panel 100 of the inventive system is installed by holding the panel 100 at slight angle relative to the fixed vehicle structure 102, as shown in FIGS. 5 and 6, and inserting a first edge 116" of the panel 100 into a recess 122 in the fixed vehicle structure 102. Once in position, the locator pin 126 is inserted into a corresponding hole or bushing 130 within the fixed vehicle structure 102. Next, the edge 116 opposite the first edge 116" is swung towards the fixed vehicle structure 102 to bring the second edge 116 into engagement with the fixed vehicle structure, which according to embodiments, may include bringing the second edge 116 of the panel into engagement with the bumper 142. Next, the locks 132 are rotated to engage with the receiver bracket 134, as shown in FIGS. 3 and 4. Removing the panels 100 from the vehicle V is accomplished by performing the above-described steps in reverse. That is, the locks 132 are first disengaged from the receiver bracket 134 and the second edge 116 of the panel 100 is pushed away from the fixed vehicle structure 102. Next, the panel is moved away from the fixed vehicle structure, which as shown in FIGS. 5 and 6 includes lowering the panel 100 relative to the fixed structure 102 to disengage the locator pin 126 from the corresponding bushing 130 in the fixed vehicle structure 102. Once removed from the fixed vehicle structure 102, the panel 100 may be stored in a location remote from the vehicle, such as in a garage or shed, or may be stored within the vehicle, such as in the trunk or in a designated storage compartment. According to embodiments, each removable panel 100 is configured to be installed and removed from the fixed vehicle structure 102 by a single user and/or without the use of tools. According to further embodiment, the removable panels 100 are interchangeable to allow for increased configurability and ease of use.

The inventive removable vehicle panel system 104 is thus useful for providing reduced vehicle weight which leads to increased fuel economy, increased vehicle configurability, modularity, and functionality. For example, a panel 100 can be removed from the vehicle to give the car a more open, convertible-like feel or to make more room for storing and transporting large, cumbersome items such as lumber or bicycles. Additionally, a panel 100 having a window 118 may be swapped out for a panel 100 that does not include a window to provide enhanced privacy and security when needed. Additionally, a panel 100 may be removed from the vehicle V to create a temporary pass-through or open access point, which may be useful for situations such as tailgating, car camping, or other similar situations in which items may frequently be retrieved from or placed into the interior of the vehicle. Additionally, such a temporary pass-through may be extremely useful for vehicles such as food trucks. As another example, a removable panel 100 of the inventive system 104 may also be useful as an escape hatch or emergency exit from a vehicle such as a bus, a train, a subway, an airplane, or recreational vehicle, allowing passengers to quickly and easily remove the panel 100 and safely escape the vehicle.

As yet another example, a removable panel 100 of the inventive system 104 be used as a secure closure for a storage compartment, for example within a truck bed, on an airplane, on a boat, on a house, or on a recreational vehicle. Additionally, a removable panel 100 described could be used to secure electronics outdoors, for example on a patio or on a camper, or could be used to secure items within a portable storage container such as a car top luggage carrier. The inventive removable panel system 104 also has uses unrelated to vehicles. That is, the inventive removable panel system 104 may be used as shutters on a house, for example as hurricane shutters to protect home windows from being broken by debris or as security shutters to protect the home from invasion, for example when occupants will be away from the home for an extended period of time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A vehicle removable panel system comprising: a fixed vehicle structure; and one or more removable side panels configured to be vertically oriented when engaged with the fixed vehicle structure, at least one panel of the one or more removable side panels having a vehicle exterior side, an opposite vehicle interior side, and a plurality of edges therebetween that make up a perimeter of the panel, at least one panel of the one or more removable side panels having a hook-shaped flange extending from at least one of the plurality of edges, the flange configured to removably engage with a U-shaped recess formed in the fixed vehicle structure.

2. The vehicle removable panel system of claim 1 wherein at least one of the removable panels includes a transparent portion.

3. The vehicle removable panel system of claim 2 wherein the transparent portion is formed of glass or clear polycarbonate.

4. The vehicle removable panel system of claim 1 wherein at least one panel of the one or more side removable side panels are planar.

5. The vehicle removable panel system of claim 1 wherein at least one panel of the one or more removable side panels is configured to be positioned within the fixed vehicle structure.

6. The vehicle removable panel system of claim 1 wherein the one or more removable side panels each have at least one locator pin extending from a first edge thereof.

7. The vehicle removable panel system of claim 6 wherein the at least one locator pin of each panel is configured to engage with a corresponding hole bushing positioned in the fixed vehicle structure.

8. The vehicle removable panel system of claim 6 wherein the at least one locator pin includes at least two locator pins.

9. The vehicle removable panel system of claim 1 wherein the one or more removable side panels are configured for installation to and removal from the fixed vehicle structure by a single user.

10. The vehicle removable panel system of claim 1 wherein the one or more removable side panels are configured for installation to and removal from the fixed vehicle structure without the use of tools.

11. The vehicle removable panel system of claim 1 wherein the one or more removable side panels are two or more side panels and at least two of the side panels are interchangeable.

12. The removable panel system of claim 1 further comprising a plurality of locks that are configured to interact to secure one of the one or more removable side panels to the fixed vehicle structure.

13. The removable panel system of claim 12 wherein the plurality of locks interact with a receiver bracket of the fixed vehicle structure.

14. The removable panel system of claim 12 wherein the plurality of locks are positioned on an interior side of the panel.

15. The removable panel system of claim 12 wherein the plurality of locks are positioned adjacent to a second edge of the panel.

16. The removable panel system of claim 1 further comprising a water management system positioned between one of the one or more removable side panels and the fixed vehicle structure.

17. The removable panel system of claim 16 wherein the water management system is attached to each of the one or more removable panels.

18. The removable panel system of claim 16 wherein the water management system comprises a weather strip or sealable gasket positioned along a perimeter of the removable panel.

19. The removable panel system of claim 1 wherein the at least one panel is configured to swing relative to an interface formed between the flange and the recess.

20. The vehicle removable panel system of claim 1 further comprising a water management system positioned on an edge of the flange and that is configured to be positioned within the U-shaped recess formed in the fixed vehicle structure when the flange of the least one panel is engaged with the recess.

\* \* \* \* \*